Figures 1, 2:
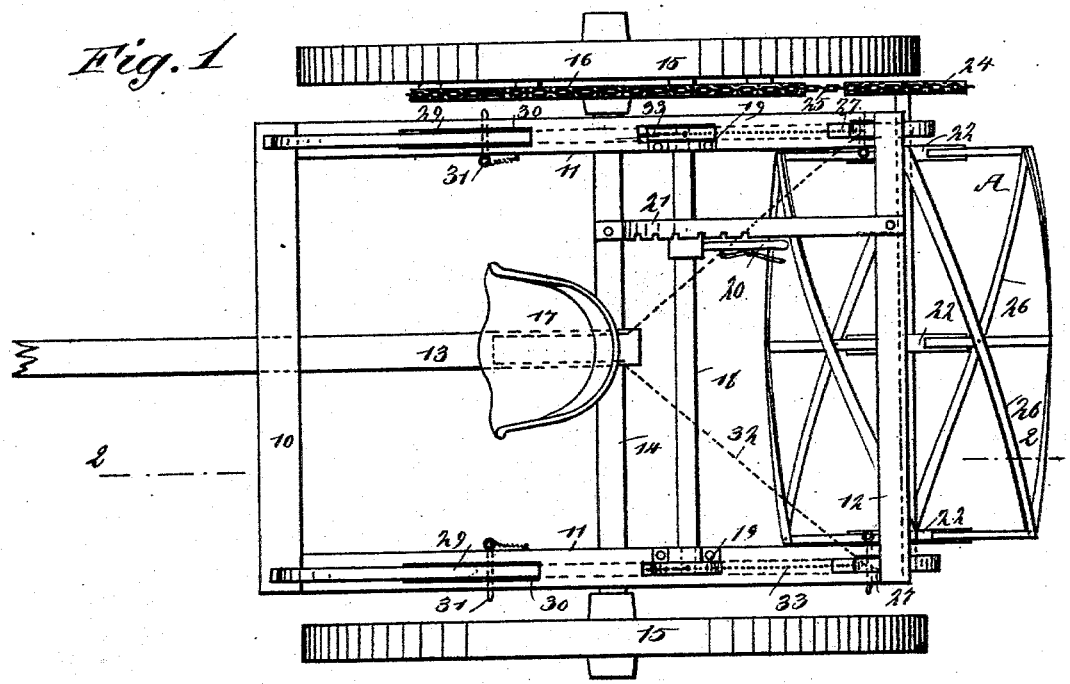

(No Model.)

J. F. DOLE.
WEED CUTTER.

No. 516,000. Patented Mar. 6, 1894.

WITNESSES:
C. Neveux
C. Sedgwick

INVENTOR
J. F. Dole
BY
Munn & Co
ATTORNEYS.

UNITED STATES PATENT OFFICE.

JOHN FRANKLIN DOLE, OF COLFAX, WASHINGTON.

WEED-CUTTER.

SPECIFICATION forming part of Letters Patent No. 516,000, dated March 6, 1894.

Application filed June 17, 1893. Serial No. 477,964. (No model.)

*To all whom it may concern:*

Be it known that I, JOHN FRANKLIN DOLE, of Colfax, in the county of Whitman and State of Washington, have invented a new and Improved Weed-Cutter, of which the following is a full, clear, and exact description.

My invention relates to a weed cutter, and it has for its object to provide a machine of that description, in which the cutters will be rotary ones and the blades so located that while a number of them will be employed they will not clog, and whereby further the blades will enter the ground first at one end and gradually bury themselves their entire length and thereby prevent the jumping of the machine as it is drawn along.

Another feature of the invention consists in employing a rotary cutter, sundry of the blades of which will be in the ground while the others will be out, and to provide a means whereby the cutter will be given a rapid rotary motion, and guides whereby the cutter will be supported in whatever position it may be placed, both vertically and laterally.

Another feature of the invention consists in constructing a machine which will be exceedingly simple, durable and economic.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in both the views.

Figure 1 is a plan view of the weed cutter; and Fig. 2 is a vertical longitudinal section taken practically on the line 2—2 of Fig. 1.

In carrying out the invention the frame of the machine is preferably made somewhat rectangular and of skeleton form, comprising a front bar 10, parallel side bars 11 connected by the front bar and by a rear bar 12. The pole 13, is secured preferably to the axle 14, and said axle is located usually at the central portion of the frame. The axle carries two supporting wheels 15, which are loosely mounted upon the axle, and one of the wheels 15 has secured to it a driving wheel 16, usually of the sprocket pattern, and the driver's seat 17, is placed upon one end of the pole or tongue.

At the rear of the axle a shaft 18, is journaled in the frame, and this shaft carries at each of its ends a small wheel 19, and the shaft is rotated or rocked by means of a lever 20, secured to it and provided with the usual thumb latch, the latter being adapted for engagement with a rack 21, properly located upon the frame. The rack usually extends from the rear bar to the axle, as shown in Fig. 1.

The cutter A is of peculiar construction.
It is shaped practically as a wheel, and is of a length corresponding substantially to the width of the frame. The cutter comprises an axle or shaft $21^a$, upon which near each end a disk or hub 22, is firmly attached, as is likewise a third disk or hub intermediate of the end ones. Each disk or hub is provided with a number of radiating spokes 23, and the spokes of one hub are out of alignment with the spokes of an adjacent hub. The shaft or axle $21^a$, is likewise provided at one of its extremities with a sprocket wheel 24, and the said wheel is connected by a chain 25, with the driving wheel 16, and by this means the cutter is rotated as the machine is drawn ahead.

The blades 26 of the cutter may be of any desired number, and they extend from one outer disk or hub to the other, being attached to the outer extremities of the spokes 23 in any suitable or approved manner. The blades are diagonally located with respect to the shaft $21^a$; in fact, they are somewhat spirally connected with the hubs, as is best shown in Fig. 1; and the blades are given any desired pitch, the pitch however being sufficient to admit of the weight of the back of the knives causing the cutting edges to readily enter the ground. By reason of the diagonal or spiral location of the blades upon the cutting wheel, one end of a blade will enter the ground in advance of its remaining portion; and in this manner the entrance of the blades into the ground is gradual, and consequently the machine is prevented from jumping when in operation, which would be the effect if the blades were suddenly entered their whole length into, and permitted to remain for any length of time in the ground.

The diameter of the cutting wheel may be as great as in practice may be found desirable, and the knives or blades are placed at such a distance apart that they will readily free themselves from any weeds or other obstructions that may cling to them as they leave the ground. Two or three of the knives or blades will be cutting the weeds below the surface of the ground while the others will be out of the ground and clearing themselves.

The cutting wheel is held at the rear of the machine between the supporting wheels and is prevented from touching said wheels by means of guide standards 27, which standards have vertical movement in suitable openings made in the side bars of the frame at the back. The boxes in which the axle of the cutting wheel revolves are made in or located upon the lower ends of the standards 27; and the standards may be held a greater or less distance from the ground, thereby holding the cutting wheel in an upper or lower position, by means of pins 28, or like devices, passed through the frame and through the standards, as shown in Fig. 2.

In order to give the proper forward or rearward inclination to the cutting wheel, two other guide standards 29, are employed. These guide standards 29, have a hinged connection with the lower ends of the rear or upright standards 27, as shown in dotted lines in Fig. 2, and the standards 29, are carried at an inclination in direction of the front of the machine, and are passed upward through slots 30, produced longitudinally in the side beams of the frame forward of the axle, as illustrated in Fig. 1; and the inclined or forward standards are held in whatever position they may be placed by pins 31 passed through them and through the frame.

In order that the wheel shall be rendered secure in the position in which it is placed, guide chains 32, are secured to the axle near its center, and at their rear ends the chains are secured to the rear guide standards 27, as near to the periphery of the cutting wheel as possible. The locking pins being out of engagement with the guide standards of the cutting wheel, the latter may be raised or lowered very conveniently by rocking the shaft 18, and this adjustment of the cutting wheel is effected by attaching a chain 33 to the peripheral surface of each wheel 19 mounted upon the rock shaft, the chains being passed partially around the wheel in suitable grooves, while the lower ends of the chains are secured to the lower portions of the rear guide standards 27.

Such a machine as has been above described is simple, economic and durable, and will effectually cut all weeds from the ground, cutting the weeds at the roots below the surface of the ground, and will leave in its wake a surface perfectly clear of growing weeds.

Having thus described my invention, I claim as new and desire to secure by Letters Patent—

1. In a weed cutter, the combination of the framing, the cutting wheel the vertically adjustable guide standards and guy chains or connections secured at their forward ends near together and diverging thence and connected at their rear ends to the guide standards, substantially as set forth.

2. In a weed cutter the combination of the framing the supporting and drive wheels, the guide standards arranged in pairs at the opposite sides of the frame, the standards of each pair being pivoted together and having a sliding connection with the frame the cutting wheel journaled to said standards, and lifting devices for elevating said wheel and standards, substantially as set forth.

3. In a weed cutter, the combination, with a rotating wheel-cutter, having its peripheral surface formed by a series of blades arranged at distances apart and extending longitudinally of the frame, guide standards having vertical adjustment, in which the trunnions of the wheel have their bearings, and a second set of guide standards extending diagonally in the frame of the machine, and pivotally connected with the vertical guide standards the diagonal guide standards having end adjustment, as and for the purpose set forth.

4. In a weed cutter, the combination, with a frame, an axle, supporting wheels mounted upon the axle, a driving wheel carried by one of the wheels, and a rock shaft supported within the frame, of guide standards vertically adjustable in the frame, inclined guide standards likewise adjustably connected with the frame and with the vertical standards, a wheel cutter mounted to turn in one set of guide standards, the peripheral surface of the said cutter consisting of a series of spaced blades extending from end to end of the cutter frame, and a lifting connection between the rock shaft and the cutter, whereby the latter may be raised or lowered, as and for the purpose specified.

JOHN FRANKLIN DOLE.

Witnesses:
CHARLES M. WYMAN,
F. M. ELLSWORTH.